(12) United States Patent  
Pegden

(10) Patent No.: US 8,156,468 B2
(45) Date of Patent: Apr. 10, 2012

(54) SYSTEM AND METHOD FOR CREATING INTELLIGENT SIMULATION OBJECTS USING GRAPHICAL PROCESS DESCRIPTIONS

(75) Inventor: Claude Dennis Pegden, Sewickley, PA (US)

(73) Assignee: Simio LLC, Sewickley, PA (US)

( * ) Notice: Subject to any disclaimer, the term of this patent is extended or adjusted under 35 U.S.C. 154(b) by 230 days.

(21) Appl. No.: 12/470,812

(22) Filed: May 22, 2009

(65) Prior Publication Data

US 2010/0077377 A1 Mar. 25, 2010

Related U.S. Application Data

(63) Continuation-in-part of application No. 12/284,662, filed on Sep. 24, 2008, now abandoned.

(51) Int. Cl.
*G06F 9/44* (2006.01)
(52) U.S. Cl. ......... 717/105; 717/113; 717/116; 717/134
(58) Field of Classification Search ........................ None
See application file for complete search history.

(56) References Cited

U.S. PATENT DOCUMENTS

| | | | | |
|---|---|---|---|---|
| 5,778,227 A * | 7/1998 | Jordan | ................................... | 1/1 |
| 5,809,506 A * | 9/1998 | Copeland | ............................. | 1/1 |
| 5,838,973 A * | 11/1998 | Carpenter-Smith et al. | ... | 717/105 |
| 5,907,706 A * | 5/1999 | Brodsky et al. | ................ | 717/105 |
| 5,911,070 A * | 6/1999 | Solton et al. | .................... | 717/105 |
| 5,923,867 A * | 7/1999 | Hand | ................................ | 703/14 |
| 5,978,581 A * | 11/1999 | Sadiq et al. | ..................... | 717/104 |
| 5,983,016 A * | 11/1999 | Brodsky et al. | ................ | 717/104 |
| 6,052,526 A * | 4/2000 | Chatt | ............................. | 717/136 |
| 6,199,195 B1 * | 3/2001 | Goodwin et al. | .............. | 717/104 |
| 6,226,792 B1 * | 5/2001 | Goiffon et al. | ................. | 717/120 |
| 7,421,715 B1 | 9/2008 | Margulis et al. | | |
| 2003/0016246 A1 | 1/2003 | Singh | | |
| 2005/0010598 A1 | 1/2005 | Shankar | | |
| 2005/0257194 A1 | 11/2005 | Morrow et al. | | |

OTHER PUBLICATIONS

Claude Dennis Pegden. Future directions in future directions in simulation modeling. Winter Simulation Conference'2005. pp. 1-35.*

* cited by examiner

*Primary Examiner* — Tuan Dam
*Assistant Examiner* — Zheng Wei
(74) *Attorney, Agent, or Firm* — David G. Oberdick; Peter J. Borghetti

(57) ABSTRACT

An object-oriented, computer-based system for developing simulation models is provided. The system comprises one or more base objects and one or more graphical processes, wherein new objects are created from base objects by a user by assigning one or more graphical processes to the base object(s). New objects are created without the need for methods or computer programming. A model is built by creating objects that represent the physical components of the system being modeled into the model, and then running the model.

13 Claims, 13 Drawing Sheets

Click on the Run button located on the Home tab. Your running model should look something like this:

(GO TO FIGURE 10B FOR SCREEN SHOT)

FIG.1
NEW PROCESS I : TRANSFER INPUT BUFFER
NEW PROCESS II : TRANSFER PROCESS
NEW PROCESS III : TRANSFER OUTPUT BUFFER
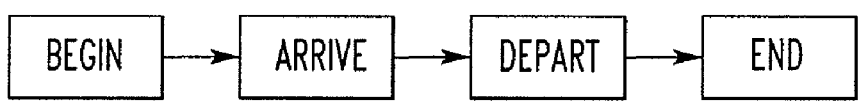
FIG.2

INHERITED PROCESS : TRANSFER IN
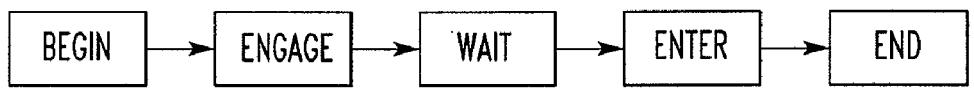
OVERRIDDEN PROCESS: TRANSFER OUT
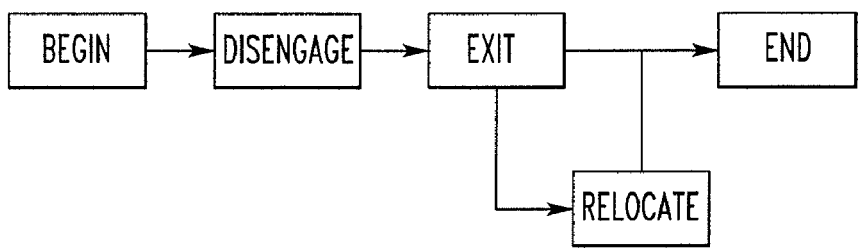
INHERITED PROCESS : TRANSFER NEXT
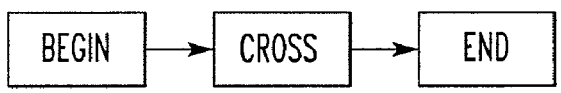
NEW PROCESS : COLLISION
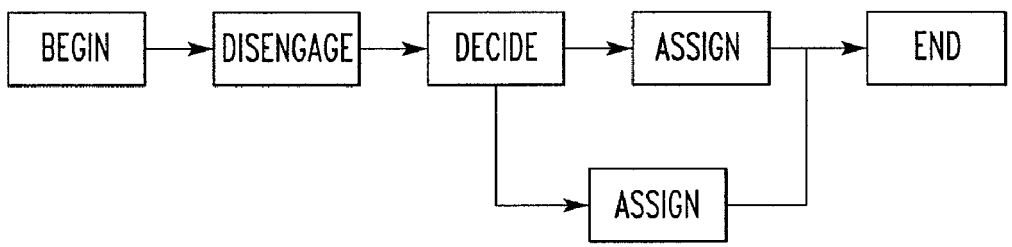
NEW PROCESS : SEPARATION
FIG.3
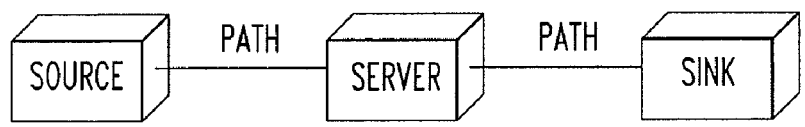
FIG.4

*Building a Simple Model*

If you have not already done so, please follow the instructions in the file: *Simio Installation Notes.pdf* that accompanied the Simio software to install it.

Running SimioDesign.exe will bring you to a welcome screen containing some useful and up-to-date information about the product.

*Exploring the Model Window*

To start a new model either click on the *Create a new model*...link on the welcome screen, or click the *New Model* button on the *Home* ribbon tab.

After creating the model, the application window should look like this:

(GO TO FIGURE 5B FOR SCREEN SHOT)

*FIG. 5A*

At the top of the window is the *ribbon*. (This UI paradigm was introduced in Microsoft Office 2007) The ribbon consists of three components:

An application button, which drops a menu to allow you to create, open, and save Simio projects.

A Quick Access Toolbar, which allows you to get to commonly used commands, such as save project, undo, and redo.

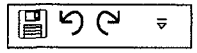

A set of tabs, which contain the various controls for view management, model creation, run control and setup, and symbol drawing, respectively.

In the center of the application window you will see the *Facility View* where you will build your model. On the left of the application window you will see components of the *Embedded Library*. You will drag objects from this into the *Facility View* to create your first model. The items with icons next to them are Object Types, there for categorization (currently not categorized in Sprint 8). Items without icons are Object Definitions (or Object Classes), and are used to build your facility model. Under the Embedded Library (Standard Object Library) there is another tab called the Project Library where you can drag the models into facility views the same way you do any other library. In the upper right you will find the *Project View* window. This window contains a list of all the models in your project. Finally, in the lower right is the *Properties Window*, where you are able to set the properties for each object.

Before you start building your model, click once on an Object Definition in the *Standard Library* (for example, click on the Source item). If you look to the *Properties Window* you will see the default properties for that object. If you change these, it will change the default properties on each Object Instance that you place.

Building a Model

For this walk through, you will be creating a simple Source-Server-Sink model. First, click on the Source object definition in the *Embedded Library* and drag it into the upper left part of the *Facility View*. Once you have dropped it, you should see a Source object instance called *Source1*.

Follow the same process to drag a Server to the middle of the *Facility View* and a Sink to the lower right of the *Facility View*. To select any of these objects in order to move them or change their properties, you must click on the name (e.g. *Sink1*), not the graphic. For this walk through, we will leave the properties for all the objects at their defaults.

FIG. 6

After you have all three objects in the *Facility*View, your screen should look something like this:

(GO TO FIGURE 7B FOR SCREEN SHOT)

Your next step is to connect the objects.

The diamond shapes on the objects are called *Nodes.* They represent places that *Entities* can enter and leave. Although we won't be changing anything now, to review or change node properties, you may control-click on the diamond shape and you will see its properties appear in the properties window. Node properties are used to specify entity destination and transporter selection logic.

*FIG. 7A*

Click and hold the left mouse button on the *Transfer Node* of *Source1*. Drag the mouse to the left *Transfer Node* of *Server1*, and release the mouse button. A menu will appear to select the *Link* type, select Path.

(GO TO FIGURE 8B FOR SCREEN SHOT)

Now click and hold the left mouse button on the right *Node* of *Server1*. Drag the mouse halfway between *Server1* and *Sink1*. Release the left mouse button. You have now started a connection from *Server1* and placed a mid-point for it. You may place more mid-points for the connection by clicking various places in the *Facility View*, or you can finish the connection by clicking on the *Node* of *Sink1*. A menu will appear for you to select the *Link* type, select Path.

*FIG. 8A*

It should now look something like the following screen shot.

(GO TO FIGURE 9B FOR SCREEN SHOT)

Congratulations, you have built your first Simio model!

Please save this model in order to reuse it later on in this Guide. In order to save your model/project, select the Green triangle button located on the ribbon at the top left corner of the main Simio window. Then select the Save Project As item from the drop down menu. Use the Windows Explorer window to complete the saving of your file.

*FIG. 9A*

Click on the Run button located on the Home tab. Your running model should look something like this:

(GO TO FIGURE 10B FOR SCREEN SHOT)

*FIG.10A*

3D Animation

Simio includes a Facility 3D View which can be viewed during the building and running of a model. When Simio is loaded, you will get a 3D window. Notice the instructions at the top of the window that describe currently supported functionality. At any time, click on the *P* key and a view like the following screen shot will appear.

(GO TO FIGURE 11B FOR SCREEN SHOT)

*FIG.11A*

SYSTEM AND METHOD FOR CREATING INTELLIGENT SIMULATION OBJECTS USING GRAPHICAL PROCESS DESCRIPTIONS

CROSS-REFERENCE TO RELATED APPLICATION

This application is a continuation-in-part of application Ser. No. 12/284,662, filed Sep. 24, 2008, incorporated by reference in its entirety.

FIELD OF THE INVENTION

This invention relates to the field of computer modeling. More particularly, the invention relates to systems and methods for developing simulation.

BACKGROUND OF THE INVENTION

Over the 50 year history of discrete event simulation, the growth in applications has been facilitated by some key advances in modeling that have simplified the process of building, running, analyzing and viewing models. Three important advances have been: (i) the modeling paradigm shift from an event to a process orientation; (ii) the shift from programming to graphical modeling; and (iii) the emergence of 2D/3D animation for analyzing and viewing model execution. These key advances were made 25 years ago and provided the foundation for the set of modeling tools in wide use today.

The past 25 years has been a period of evolutionary improvements with few significant advances in the core approach to modeling. The currently available tools are mostly refined versions of what existed 25 years ago.

Many popular programming languages such as C++, C#, and Java are built around the basic principles of object oriented programming (OOP). In this programming, paradigm software is constructed as a collection of cooperating objects that are instantiated from classes. When instantiating an object into a model, one should start by specifying the properties governing the behavior of that object. For example, the properties for a machine might include its setup, processing, and teardown time, along with a bill of materials and the operator(s) required during setup. The creator of an object decides on the number and the meaning of its properties.

The typical instantiation of classes uses the core principles of abstraction, encapsulation, polymorphism, inheritance, and composition.

Abstraction can be summarized as focusing on the essential. The basic principle is to make the classes structure as simple as possible.

Encapsulation specifies that only the object can change its state. Encapsulation seals the implementation of the object class from the outside world.

Polymorphism provides a consistent method for messages to trigger object actions. Each object class decides how to respond to a specific message.

Inheritance allows new object classes to be derived from existing object classes, sometimes referred to as the "is-a" relationship. This is also referred to as sub-classing since a more specialized class of an object is being created. Sub-classing typically allows the object behavior to be extended with new logic, and also modified by overriding some of the existing logic.

Composition allows new object classes to be built by combining existing object classes, sometimes referred to as the "has-a" relationship. Objects become building blocks for creating higher level objects.

Within this framework, objects are implemented by coding one or more methods that change the state of an object. Derived objects may override (i.e., replace) methods that are inherited from its parent class, or extend the behavior by adding additional methods.

The roots of these ideas date back to the early 1960's with the Simula 67 simulation modeling tool. That tool was created by Kristen Nygaard and Ole-Johan Dahl (1962) of the Norwegian Computing Center in Oslo to model the behavior of ships. Nygaard and Dahl introduced the basic concepts of creating classes of objects that own their data and behavior, and could be instantiated into other objects. This was the birth of modern object-oriented programming. Because Simula 67 was a programming language and not a graphical modeler, it never developed into a widely used tool.

In the early days of discrete event simulation, the dominant modeling paradigm was the event orientation implemented by tools such as Simscript (Markowitz et al., 1962) and GASP (Pritsker, 1967). In that paradigm, the "system" is viewed as a series of instantaneous events that change the state of the system. The modeler defines the events in the system and models the state changes that take place when those events occur. This approach to modeling, while very flexible and efficient, is also a relatively abstract representation of the system. As a result, many people found modeling with an event orientation to be difficult.

In the 1980's, the process orientation displaced the event orientation as the dominant approach to discrete event simulation. In the process view, one describes the movement of passive entities through the system as a process flow. The process flow is described by a series of process steps (e.g. seize, delay, release) that model the state changes taking place in the system. This approach dates back to the 1960's, with the introduction of GPSS (Gordon, 1960), and provides a more natural way to describe the system. Because of many practical issues with the original GPSS (e.g. an integer clock and slow execution), it did not become the dominant approach until improved versions of GPSS (Henriksen, 1976) along with newer process languages such as SLAM (Pegden/Pritsker, 1979) and SIMAN (Pegden, 1982) became widely used in the 1980's.

During the 1980's and 90's, graphical modeling and animation emerged as key features in simulation modeling tools. Graphical model building simplified the process of building process models while graphical animation dramatically improved the viewing and validation of simulation results. The introduction of Microsoft Windows made it possible to build improved graphical user interfaces and a number of new graphically based tools emerged (e.g. ProModel and Witness).

Another conceptual advance that occurred during this time was the introduction of hierarchical process modeling tools that supported the notion of domain specific, process libraries. The basic concept here is to allow users to create new process steps by combining existing process steps. The widely used Arena modeling system of Pegden/Davis (1992) is a good example of this capability.

Since the wide spread shift to a graphics-based process orientation, there have been refinements and improvements in the tools but no real advances in the underlying framework. The vast majority of discrete event models continue to be built using the same process orientation that has been widely used for the past 25 years.

Although a process orientation has proven to be very effective in practice, an object orientation provides an attractive alternative modeling paradigm that has the potential to be more natural and easier to use. In an object orientation, the system is modeled by describing the objects that make up the system. For example, a factory is modeled by describing the workers, machines, conveyors, robots and other objects that make up the system. The system behavior emerges from the interaction of these objects.

A number of products have been introduced to support an object orientation, to date they have all been simply the direct application of OOP languages to developing objects for use in simulation modeling. These programming-based tools have been largely shunned by practitioners as too complex. And most practitioners continue to stick with the process orientation. It is believed that much of this is due to the fact that while the underlying modeling paradigm might be simpler and less abstract, the specific implementation may be difficult to learn and use (e.g. require programming), or slow in execution. This is no different than the challenges faced by the process orientation unseating the event orientation. Although the first process modeling tool (GPSS) was introduced in 1961, it took 25 years before the process orientation was developed to the point where practitioners were persuaded to make the paradigm shift.

Although simulation has traditionally been applied to the design problem, it can also be used on an operational basis to generate production schedules for the factory floor. When used in this mode, simulation is a Finite Capacity Scheduler (FCS) and provides an alternative to other FCS methods such as optimization algorithms and job-at-a-time sequencers. Simulation-based FCS has a number of important advantages (e.g. speed of execution and flexible scheduling logic) that make it a powerful solution for scheduling applications.

Simulation provides a simple yet flexible method for generating a finite capacity schedule for the factory floor. The basic approach with simulation-based scheduling is to run the factory model using the starting state of the factory and the set of planned orders to be produced. Decision rules are incorporated into the model to make job selection, resource selection, and routing decisions. The simulation constructs a schedule by simulating the flow of work through the facility and making "smart" decisions based on the scheduling rules specified. The simulation results are typically displayed as jobs loaded on interactive Gantt charts that can be further manipulated by the user. There are a large number of rules that can be applied within a simulation model to generate different types of schedules focused on measures such as maximizing throughput, maintaining high utilization on a bottleneck, minimizing changeovers, or meeting specified due dates.

Because of the special requirements imposed by scheduling applications (including the need for specialized decision rules and the need to view results in an interactive Gantt chart form), simulation-based scheduling applications have typically employed specialized simulators specifically designed for this application area. The problem with this approach is that such specialized simulators have built-in, data-driven factory models that cannot be altered or changed to fit the application. In many cases, this built-in model is an overly simplified view of the complexities of the production floor. This one-model-fits-all approach severely limits the range of applications for these tools. Some production processes can be adequately represented by this fixed model, but many others cannot.

There is a continued need for a simulation modeling system that is easy to use, does not require programming skills on the part of the user, and can be tailored to, and used in, a variety of environments and applications.

SUMMARY OF THE INVENTION

Accordingly, in one aspect the present invention provides a computer-based system for developing simulation models, the system comprising one or more base objects and one or more graphical processes, wherein a new object is created from a base object by a user by assigning one or more graphical processes to the base object. A model is built by graphically combining one or more base, derived, and/or composite objects that represent physical components of a system being modeled.

In another aspect, a computer-implemented method of creating a new object in a computer-based modeling system, the method comprising the step of assigning one or more graphical processes to a base object, a derived object or a composite object, to create the new object.

In an additional aspect, a computer-implemented method of modeling a physical system, the method comprising the steps of 1) graphically combining one or more base, derived, and/or composite objects in a computer-based modeling system that represent physical components of the physical system being modeled, and 2) running the model.

This invention describes a new modeling system, Simio™, which is a departure from the design of existing modeling tools with the aim of improving the activity of model building. Simio™ is designed to simplify model building by promoting a modeling paradigm shift from the process orientation to an object orientation.

Accordingly, the present invention makes model building dramatically easier by providing a new object-based modeling system that radically changes the way objects are built. Unlike existing object-oriented tools that require programming to implement new objects, Simio™ objects can be created with simple graphical process flows that require no programming. In Simio™, a derived object can be created from another object by overriding one or more processes and/or extending an object by adding processes to same. Simio™ also creates a composite object by combining one or more base or derived objects with one or more processes.

By making object building a much simpler task that can be done by non-programmers, this invention can bring an improved object-oriented modeling approach to a much broader cross-section of users. This invention creates a greatly expanded group of potential users for object-based modeling.

BRIEF DESCRIPTION OF THE DRAWINGS

Further features, objects and advantages of this invention will become clearer when referring to the drawings in which:

FIG. 1 is a prior art process flow model of a simple service activity in which entities are created, wait to be processed, and are then destroyed. The process flowchart is used to model a system and not to create objects that can serve as a building block for creating other models. FIG. 1 depicts a classic use of process flows in simulation modeling.

FIG. 2 is a simple server object in Simio™ built from three separate process flows: (i) a Transfer Input Buffer; (ii) a Transfer Process; and (iii) a Transfer Output Buffer. These three process flows work together to define the behavior of this object. In the present invention, the process flows are not being used to directly model the system, but rather to define a server object (for example, an object that provides a service such as a bank teller or a waitress) that can then be used in building a model.

DETAILED DESCRIPTION OF THE INVENTION

Figure 5B:
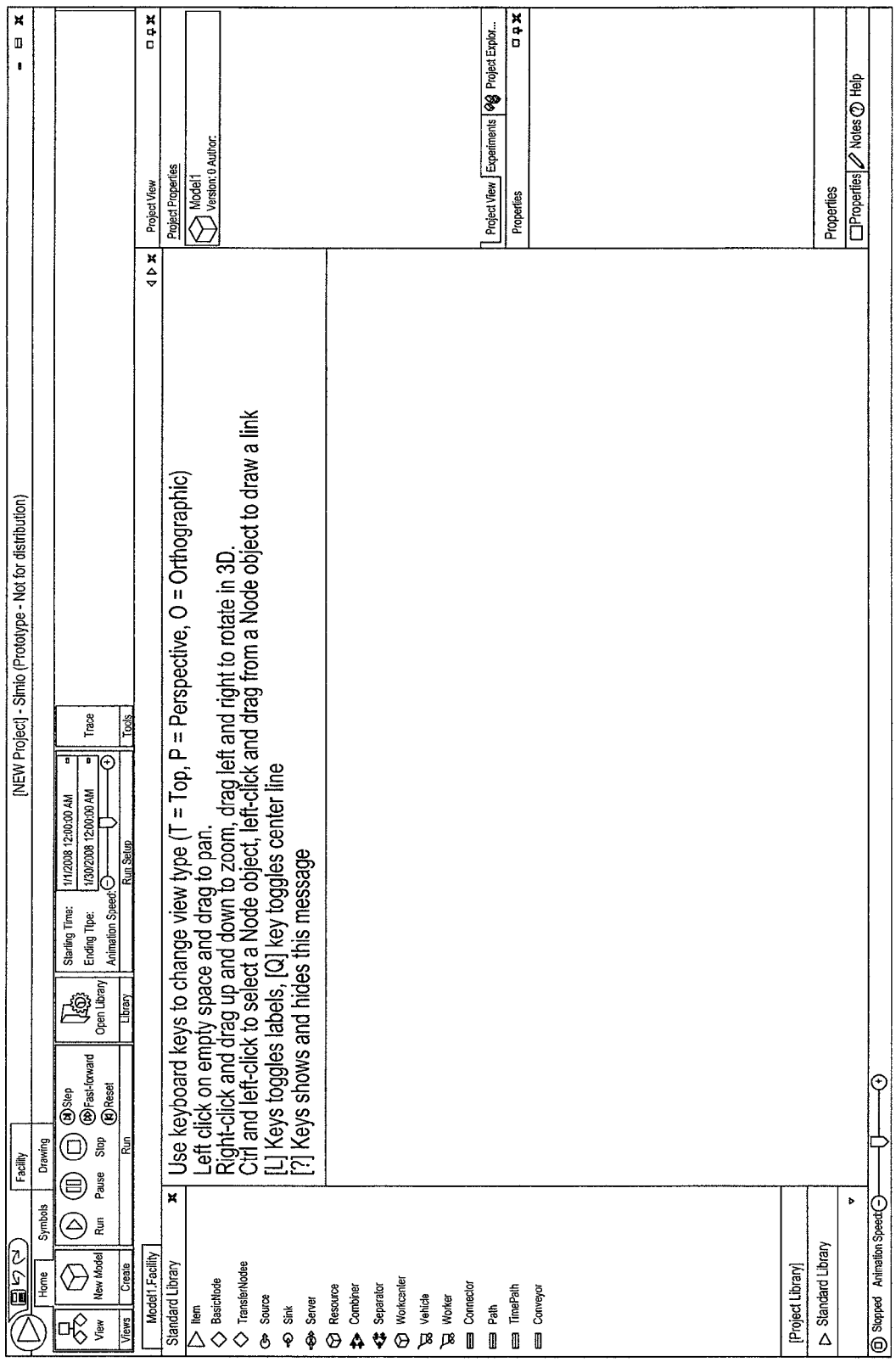

The present invention provides a new simulation modeling tool designed from the ground up to support the object modeling paradigm, and makes object orientation easy to use and efficient to execute. There are 6 basic classes of objects in Simio™, as described in Table 1:

TABLE 1

| Type | Derived From: | Description |
| --- | --- | --- |
| Intelligent Object | None | A base object with the optional ability to be seized, released, and follow an availability schedule. |
| 1. Fixed | Intelligent Object | Typically used to represent an entire system being modeled (e.g., the plant), or component objects within a system that have a fixed location (e.g., machine, equipment, work cells). |
| 2. Agent | Intelligent Object | Adds behaviors for modeling objects that can be dynamically created & destroyed, are able to move in continuous space or discrete space (on a grid), and which can detect, chase, and intercept other objects. This type of object is particularly useful for agent-based modeling approaches in which a large number (perhaps many thousands) of independently acting agents interact to create the overall behavior of the system. |
| 3. Entity | Agent | Adds behaviors for modeling objects that can follow a work flow in the system, including the ability to use a network of links to move between objects, the ability to visit, enter, & exit locations within other objects through nodes, and the ability to be picked up, carried, and dropped off by transporter objects. |
| 4. Transporter | Entity | Adds behaviors for modeling objects that can pickup entity objects at a location, carry those entities through a network of links or free space, and then drop the entities off at a destination. A transporter object also has the ability to move off of a network while maintaining association with a node on the network (i.e., "park" at a node in a network). |
| 5. Link | Fixed | Adds behaviors for modeling fixed objects that are pathways for entity/transporter movement. A link object has a length which may be separated into equally spaced locations (cells), must have a start node and end node, and is a member of one or more networks. |
| 6. Node | Fixed | Adds behaviors for modeling fixed objects that are intersection points between link objects or the entry/exit points for visiting an object. Entities may be picked up/dropped off by a transporter at a node. Users can extend/customize the crossing logic through a node to model network flow and entity pickup/dropoff points. |

FIG. 3 is a more complex model of an accumulating conveyor object that inherits processes from a simple conveyor, then overrides one of the processes and adds two additional processes to same. In this model, the object oriented constructs of inheritance, overriding, and extension are used to create a new object (accumulating conveyor) from an existing object (simple conveyor).

FIG. 4 is a simple model of a service system (e.g. a bank teller) built from a very simple library of Simio™ objects. The model includes a Source object that generates customers that enter the system, travel across a path to a Server object where they are processed one at a time, and then travel across a second path to a Sink object where they depart the system. The objects used in building this simple model are built without programming based using graphical processes such as those in FIGS. 1, 2, and 3.

Figure 7B:
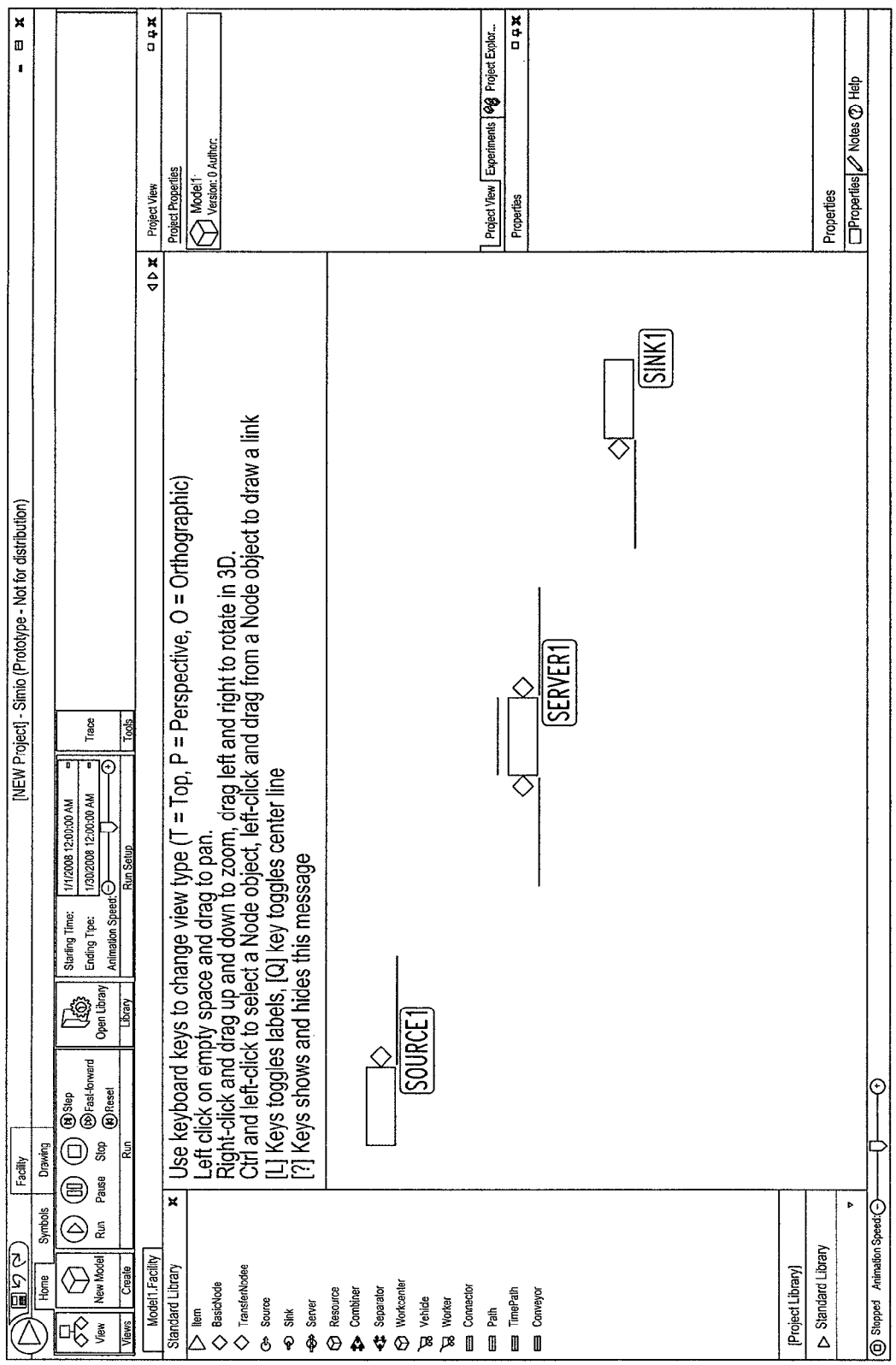
Figure 8B:
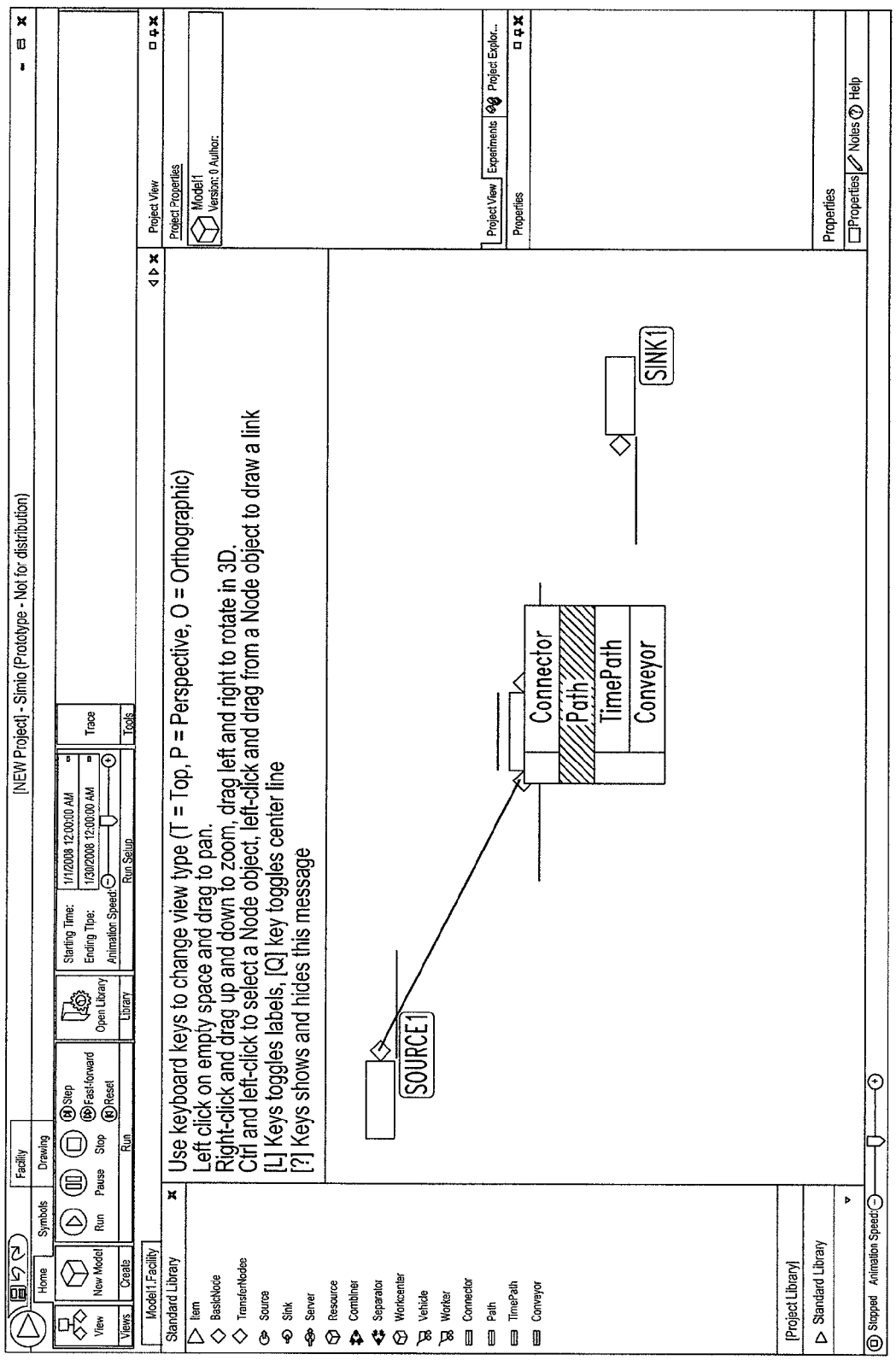
Figure 9B:
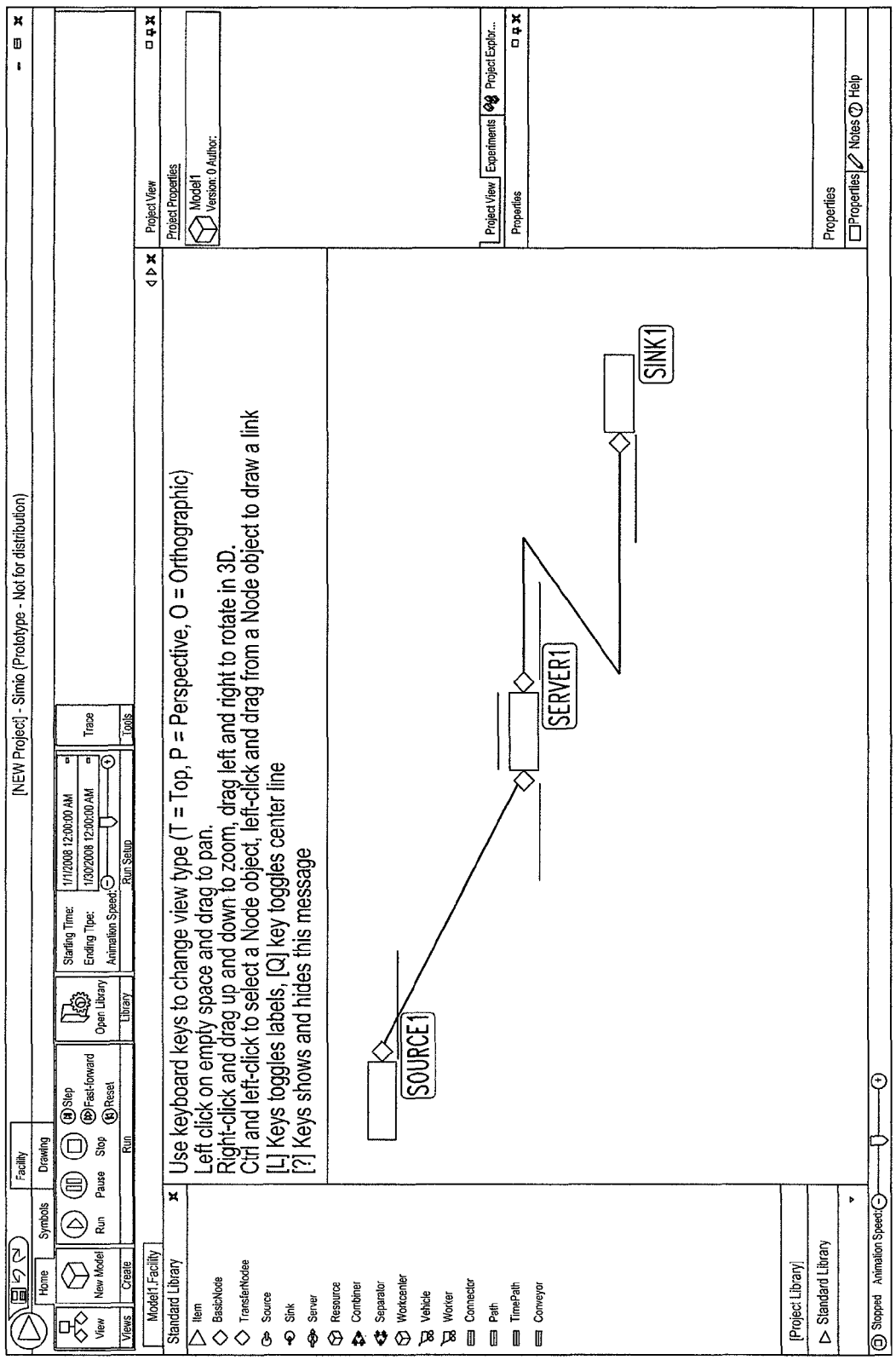
Figure 10B:
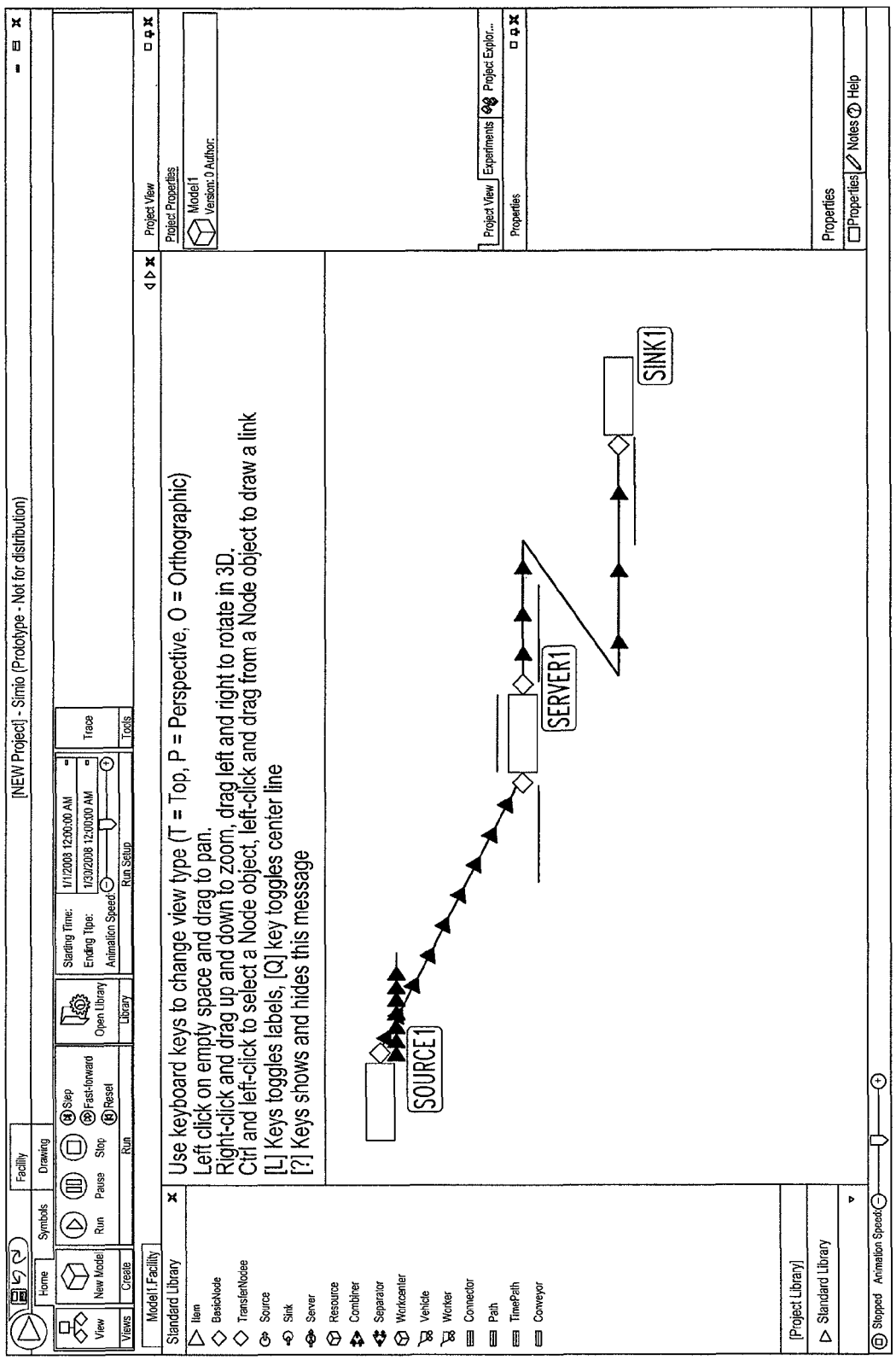

FIGS. 5-11 are pages from the Simio™ users guide, with instructions on how to build a simple model:

FIG. 5 illustrates the Welcome screen and provides instructions on creating a new model;

FIG. 6 explains various features and buttons on the Welcome screen;

FIG. 7 illustrates placing three types of objects in a simple model;

FIG. 8 illustrates how to connect objects in a model;

FIG. 9 illustrates a completed model;

FIG. 10 is a screen shot of a running model; and

Figure 11B:
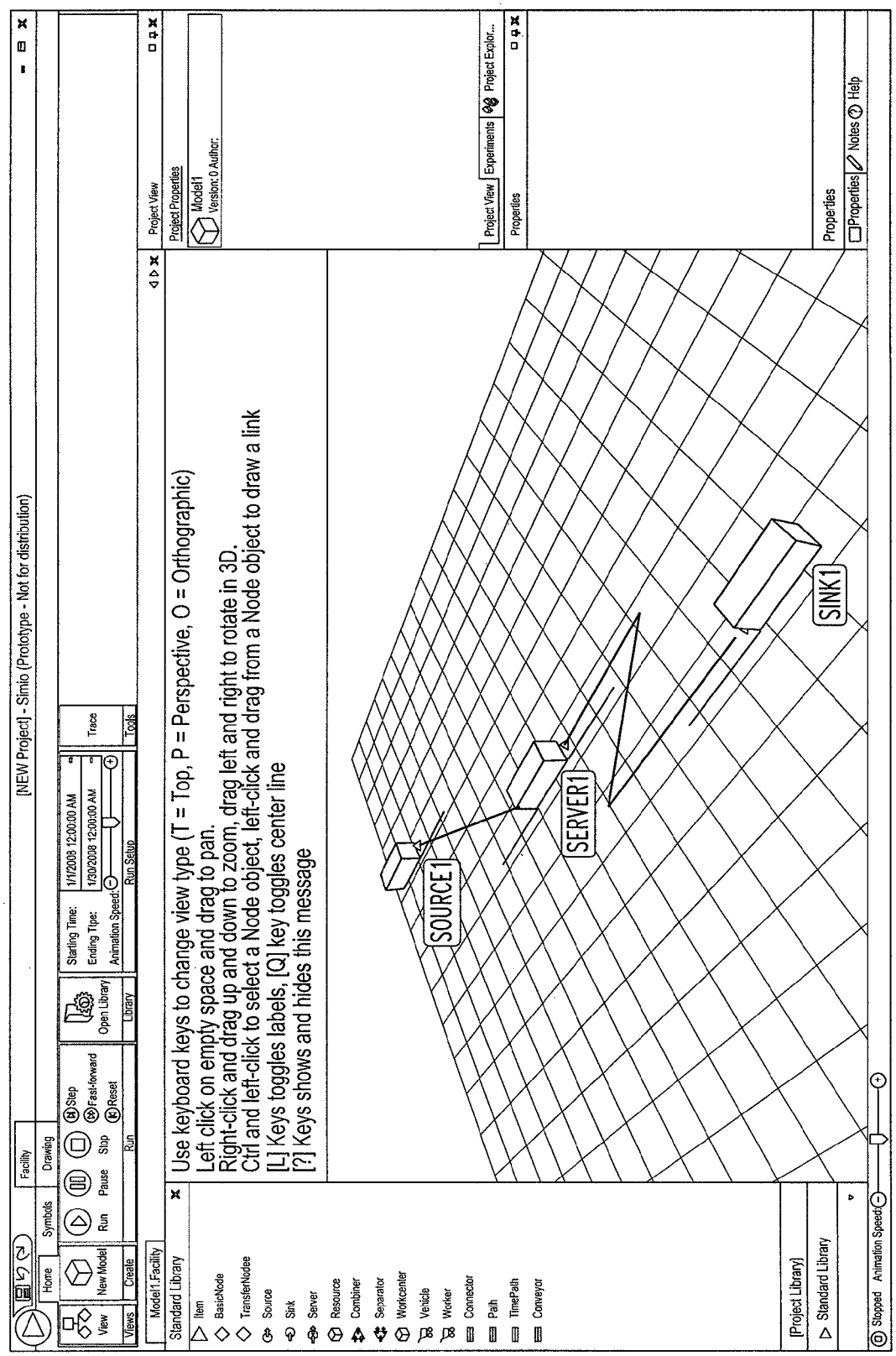

FIG. 11 illustrates a graphical view of model.

In the present invention, intelligent objects are built by modelers and may be reused in multiple modeling projects. Objects can be stored in libraries and easily shared. A beginning modeler may prefer to use pre-built objects from libraries. However, the modeling tool of the present invention also supports the seamless use of multiple modeling paradigms including a process orientation and event orientation. It fully supports both discrete and continuous systems along with large scale applications based on agent-based modeling. Such modeling paradigms can be freely mixed within a single model.

The present invention is designed to make it easy for beginning modelers to build their own intelligent objects for use in building hierarchical models. Unlike existing object-based tools, no programming is required to add new objects.

General Concepts

A user begins by creating a project. A single project may be open in Simio at a time. When a new project is created, a default model (of object class type Fixed) is automatically added to the project. A project may be saved to a project file, and that file will contain all of the elements in the project. Thus, a user can distribute an entire project by distributing a single project file.

The major components in a Simio project include:
Models
Experiments
Reports

A model describes the logic, external interfaces, data structure, and presentation/animation for a class of objects. A model may be added to a library and then instances of that model embedded in another model. Thus, a user will be able to easily create a library that is a collection of models developed for some particular application domain or modeling effort. Libraries are saved to library files. Library files may be distributed and opened independent of projects.

Users can share models (via project files, model files, or libraries) without requiring library file dependencies for any embedded models in those models. Users can also distribute models between projects.

An experiment is a single scenario or set of scenarios that are run against a model in "batch mode" to minimize execution time (i.e., a fast-forward mode with no animation, debugging, or dashboard functionality enabled). Usually multiple replications of each scenario are run. An experiment is not owned by a model. Rather, an experiment references and uses a model (is "bound" to a model). This means that, if a model is removed from a project, any experiments that referenced and used that model may remain in the project to preserve experiment results.

To configure an experiment, the user specifies the model to be used as well as some run parameter properties such the random number generation approach. The user can also specify control inputs that may be parameterized and varied by scenario, as well as output responses that will be collected by scenario. Any of the model's properties will be available for selection as a control input. An output response may be based on any model expression. An output expression will typically reference one or more state variables in the model.

TABLE 2

An Example Experiment Scenario Table

| Scenario Name | Scenario 1 | Scenario 2 |
| --- | --- | --- |
| Status | Idle | Idle |
| Replications Required | 10 | 50 |
| Replications Completed | 0 | 0 |
| Report Statistics | True | True |
| Work Schedule | Always Available | Always Available |
| Capacity Type | Unit | Unit |
| Capacity | 1 | 1 |
| Capacity Schedule | null | null |
| Ranking Rule | First In First Out | First In First Out |
| Ranking Expression | 0.0 | 0.0 |
| Dynamic Rule | None | None |
| Dynamic Expression | 0.0 | 0.0 |

If multiple experiments are defined in a project, a user will be able to selectively run an individual experiment, or be able to run multiple experiments consecutively (i.e., some subset or all). When an experiment is run, raw output results will be collected for each replication by scenario and stored into data sets in the experiment. For an individual scenario within an experiment, a user can run additional replications on top of previous replications that have already been run.

Simio's experiment framework permits the development and integration of Design of Experiment add-ons/wizards that help automatically construct an experiment's scenario table (e.g., wizards that set up scenarios for sensitivity analysis or factorial designs). Optimization tools such as OptQuest can also be integrated into experiments. Experiments can also be distributed between projects by a user.

Reports retrieve, format, and present the results from one or more experiments that have been run. Example of report elements might include:
  Tabular reports.
  Free-style reports.
  Charts and Graphs Some basic summary reports might be provided for a created experiment by default. However, users have the ability to easily create and design their own reports. A user will be able to easily create a report that compares results not only across different scenarios within an experiment, but also results across different experiments (e.g., a chart that compares the results from an "As-Is" experiment to the results from a "To-Be" experiment). Users can distribute reports between projects.

The Simio™ Object Paradigm

In Simio™, an object might be a machine, robot, airplane, customer, doctor, tank, bus, ship or any other thing that one might encounter in his/her system. A model is built by combining objects that represent the physical components of the system. A Simio™ model looks like the real system. The model logic and animation is built as a single step.

An object may be animated to reflect the changing state of the object. For example: a forklift truck raises and lowers its lift; a robot opens and closes its gripper; and a battle tank turns its turret. The animated model provides a moving picture of the system in operation.

Objects are built using the concepts of object-orientation. Unlike other object-oriented simulation systems, however, the process of building an object in the present invention is simple and completely graphical. There is no need to write programming code to create new objects.

The activity of building an object in Simio™ is identical to the activity of building a model therein. In fact, there is no difference between an object and a model with the present invention. This concept is referred to as the equivalence principle and is central to the design of Simio™. Whenever one builds a model, it is by definition an object that can be instantiated into another model. For example, if two machines and a robot are combined into a model of a work cell, the work cell model is itself an object that can then be instantiated any number of times into other models. The work cell is an object just like the machines and robot. In Simio™, there is no way to separate the idea of building a model from the concept of building an object. Every model that is built in Simio™ is automatically a building block that can be used in building higher level models.

In the present invention, the same principles used in designing object oriented programming languages are applied within a modeling framework rather than a programming framework. This distinction between object oriented modeling and object oriented programming is an important one. With Simio™, the skills required to define and add new objects to the system are modeling skills and not programming skills. This distinction is also important in understanding the uniqueness of the present invention in its approach to simulation modeling.

In object-oriented programming languages, new objects are built by coding one or more methods that define the state changes taking place inside the object. A method has no concept of simulated time. It cannot execute over a period of simulated time (e.g. the time required for a part to be processed through a work center). In contrast, the approach used in the present invention is to implement the internal object state changes using a process model in place of a method.

In the present invention, a graphical modeling framework is used to support the construction of simulation models designed around basic object-oriented principles. For example, when an object such as a "machine" is created in Simio™, the principle of inheritance permits creation of a new class of machines that inherits the base behavior of a "machine". But this base behavior can also be modified (overridden) and extended. In a programming language, behavior can be extended or overridden behavior only by writing methods in a programming language.

In the present invention, the process model can be built graphically as a flowchart depicting one or more process steps. The core Simio™ system contains a number of process steps which are used by the user to define specific processes. This is the same process widely used by practitioners for model building (as shown in FIG. 1), but in the present invention it is applied to creating objects (FIGS. 2 and 3). A list of some of the basic steps is shown in Table 3. This list is not exhaustive, and other steps are available for more advanced modeling as well as for link, node and transporter-specific modeling.

TABLE 3

General Modeling: Basic Steps

| Step | Description |
| --- | --- |
| Assign | Assigns a value to a state variable. |
| Decide | Decides between two paths based on a probability/condition. |
| Delay | Delays by a specified time. |
| Wait | Waits for a specified event. |
| Tally | Tallies a specified value. |
| Arrive | Completes a transfer to a specified station. |
| DepartParent | Initiates a transfer from out of the parent object at a specified station. |
| Create | Creates a visiting entity at a specified station. |
| Destroy | Destroys the visiting entity. |
| Seize | Seizes a quantity of a resource. |
| Release | Releases a quantity of a resource. |

Each step in Simio™ models a simple process such as: holding the token for a time delay; seizing/releasing of another object; waiting for an event to occur; assigning a new value to a state; or deciding between alternate flow paths. Some steps (e.g. Delay) are general purpose steps that are useful in modeling objects, links, entities, transporters, agents, and groups. Other steps are only useful for specific objects. For example, the Pickup and Dropoff steps are only useful for adding intelligence to transporters; and the DepartLink step is only useful in adding intelligence to Links.
Basic Components of a Simio Model
  The major components of a Simio model will include:
  Facility Model
  Process Model
  Properties
  States
  Events
  External Representation
  Dashboards
  Run Setups
Facility Model
  In the Facility Model a user defines a model's logic and behavior using an object-oriented composition approach, by adding object instances of other models (from libraries) that define a facility model for the model. A facility is the physical plant being modeled, such as a factory, hospital or airport.
Process Model
  In the Process Model a user can define a model's logic and behavior using a process-oriented modeling approach, by adding processes and elements that define a process model for the model.
  A simple process model can represent very complex logic that would require complex implementation of multiple methods within a traditional object-oriented language. In the present invention, this logic is defined graphically (as shown in FIGS. 2 and 3). In other tools, this logic is written in programming languages such as C++ or Java. The process models of the present invention can span simulated time and therefore simulate processes such as operation times or queuing delays that take place over simulated time.

Each process is a sequence of process steps triggered by an event and executed by a token. A token is simply a thread of execution. A token may have properties (input parameters) and states (runtime changeable values) that control the execution of the process steps. A single process may have many different tokens in different steps of the process.

Objects may also have standard processes that are automatically executed by the logic when certain conditions occur. For example, when one object "seizes" another object it automatically executes the OnSeized process (if one has been added) for the seized object. In this case the process is being triggered by the built-in object logic rather than a specific event.

Most processes in Simio™ span time, i.e., simulated time advances from the point in time when a token is first released from the Begin step until it arrives at the End step. This time delay may be caused by explicit delays at a Delay step (e.g. delay for 2 minutes), or by queuing delays at constrained steps (e.g. a Seize step).

There is a special type of process in Simio™ that is referred to as a decision process. A decision process executes in zero time and is used to make a decision about a specific action. For example, when a transporter arrives to a transfer station and decides to pick up an entity, it triggers a decision process owned by the entity that can decide to accept or reject the pickup. Since decision processes must always execute in zero time, steps that execute over time (e.g. Delay, Seize, Wait, Allocate, etc.) are not allowed in decision processes. In the pick up example the decision process for the entity might examine the existing riders on the transporter, the speed of the transporter, and the destination of the transporter in deciding if it will accept or reject the offer to be picked up.
Elements
  An element is a specialized, dynamic component owned by the modeled object such as a resource, queue, station, or statistic. An element may include its own properties (input parameters), states (runtimeable changeable values), and events. When executing a process, tokens often execute steps that change the states of elements owned by the object.
Properties
  A property is a named input characteristic that parameterizes the behavior of an object instance. Properties are helpful when object instances have the same behavior described in a model definition, but differ in some input parameter values. An object's properties are normally constant during a simulation run, and are changed only when adjusting the object behavior.
  The properties of a token or an object in Simio™ are strongly typed and therefore store specific data types such as numeric values, Booleans, strings, object references, dates and times, etc. Since any model built is by definition an object, the present invention provides an opportunity to parameterize a model through properties as well. Properties may be changed at any time by the user but not by the execution of object logic (i.e., are read-only in logic).
  Properties can be thought of as inputs to an object such as a setup or processing time, and states as output responses that change throughout the execution of the object logic.
States
  A state is a named input variable and/or output response for an object realization that describes some aspect of its state and which may dynamically change over time due to the execution of object logic. Examples of object states might include a count of completed parts, the status of a machine, an input command for a device, the temperature of an ingot heating in a furnace, the level of oil in a ship being filled, or the accumulation level on a conveyor belt.

There are two basic types of states: discrete and continuous. A discrete state variable has a value that only changes at event times (e.g., customer arrival, machine breakdown, etc.). A continuous state variable has a value that changes continuously over time (e.g., a tank level, position of a cart, etc.). Continuous states may be updated using either first order or second order rate equations, or by using numerical integration.

States are strongly typed but always map to a numeric value. For example, the Boolean's true and false maps to 1 and 0, and an enumerated list of state names map to the list index positions (0, 1 . . . , N) in the list. A state changes as a result of the execution of the logic inside the object.

Events

An event is a specific occurrence for an object that provides notification in order that some action may be taken.

There are several different ways to trigger the execution of a process. One of the most common is by a triggering event. A triggering event is simply an event that "triggers" the Begin step in the process to send out a new token. A triggering event can be one of four basic types: time event, logic event, change event, or cross event.

A time event (fired by the timer element) is a convenient way to generate random arrivals to a process. A time event is fired automatically according to a specified time pattern. This time pattern can either be a stationary or non-stationary pattern. In the case of a stationary pattern, the properties specify: the time of the first event, the time between each successive event, and the maximum number of events to fire. These parameters can be constant values (e.g. every 5 minutes), or random values (e.g. a sample from an exponential distribution). In the case of a non-stationary pattern, the properties specify a repeating pattern cycle that varies over the time of day and the day of week (or any appropriate cycle). This is useful for modeling time-dependent customer demand.

A logic event is used to trigger processes based on a logical occurrence. Here, the event is being fired by the underlying logic of the model as opposed to some specified time pattern. A typical example is a station's OnEntering event. This is a logic event that is fired whenever an entity is transferred into a station owned by the object. This is the standard way for triggering process logic to respond to an entity arrival to an object.

A change event occurs whenever a specified discrete state variable changes value (e.g. a queue length changing). A change event is defined by simply specifying a discrete state variable of interest. The change event is fired whenever the value of this state variable changes.

A cross event fired by the Monitor element and is used to monitor continuous state variables. Since a continuous state variable is constantly changing, a change event is not meaningful. Instead, a cross event is defined that is fired whenever the state variable crosses a specified threshold in either a positive, negative, or either direction. For example, a cross event can be used to trigger a process whenever the tank level reaches full (positive cross with maximum tank level) or empty (negative cross with 0). Although cross events are very useful with continuous state variables, they may also be used with discrete state variables.

External Representation

A model's external representation defines its external presentation, entity transfer points, and messaging ports if instances of the model are placed into a facility view of another model. The external view is the graphical representation of a model that is instantiated into another model. It is the view of the model as seen by the user of the model as opposed to the creator of the model. For example, the external view of a workstation might include an animated machine that drills holes into parts that are processed by the machine. The internal model for the workstation might be one or more graphical process flows. When the workstation is instantiated into a model of a factory it is the animated machine (i.e. external view) that is seen by the factory modeler, and not the internal processes (process view). The processes give the machine its behavior, and the external view gives the machine its animated appearance.

Dashboards

A dashboard is a 2D panel that provides a place for a user to build interactive displays containing 2D graphics, controls, and status displays.

Run Setups

A run setup defines a configuration of run parameters for running a model interactively with animation, debugging, and dashboard functionality enabled. Multiple run setups may be defined for the same model and the user will specify the Active Setup to use if the model is run. A startup dashboard may be defined as part of a run setup configuration.

Internal Design of Simio™

One of the internal design features of Simio™ is the use of a three tiered object structure that separates an object into: (i) an object definition; (ii) an object instance; and (iii) an object realization. The object definition specifies the object behavior and is shared by all instances of the object. An object instance is simply an instance of that object within a parent object definition (e.g. a lathe machine instance is placed inside a work cell definition). The object instance defines the property values for each individual instance of the object. This instance data is, in turn, shared by all object realizations.

The object realization is used to represent a specific realization of an instance within an expanded model hierarchy. For example, each time a new work cell instance is placed in a parent object definition (e.g. a production line), it creates the need for a new realization for the embedded lathe. Although the work cell definition is built from a single lathe instance, this single lathe instance cannot hold the state values corresponding to multiple lathe realizations that result from multiple instances of the work cell. The object realizations provide the mechanism for holding this hierarchical state information in a very compact form. The object realizations are only created during model execution. They hold only the model state variables and a reference to their parent object instance. This is a highly efficient structure. It is crucial for large scale applications such as agent-based models that can have many thousands of object realizations.

When a model is used as a building block in the construction of other models, it may be instantiated many times in many different models. It should be noted that instantiating a model is not the same as copying or cloning the model. The model instance simply holds a reference to the one model definition that is used over and over. The instance also holds the property values that are unique to each instance. However, the model logic is shared by all instances. Regardless of how many instances are created, there is only one class definition of the object, and each instance refers back to this single definition. Each instance holds the properties unique to that instance. But, it also looks back to the definition to get its underlying behavior. If the behavior in the definition is changed, then all instances automatically make use of this new behavior.

Creating New Objects in Simio™

There are three ways to create a new object definition in the present invention. In one method, an object is created by combining two or more component objects; this is similar to object building in object-oriented programming. This type of object is called a composite object. This object building approach is fully hierarchical, i.e., a composite object can be used as a component object in building higher level objects.

Another method for creating objects in the present invention is by defining the logical processes that alter their state in response to events or logical conditions in the model. For example, a machine object might be built by defining the processes that alter the machine state as events occur such as part arrival. A machine might also define behavior by adding standard processes that are executed when specific conditions occur such as going on or off shift, or having a failure. An object that is defined by describing its native processes is called a base object. A base object, in turn, can be used as a component object for building higher level objects.

The third method for building objects in the present invention is based on the concept of inheritance. In this case, an object is created from an existing object by overriding (i.e., replacing) one or more processes within the object, or adding additional processes to extend its behavior. In other words, the process starts with an object that is almost what is desired. Then, the object is modified and extended as necessary to make it serve the intended purpose. For example, a specialized drill object might be built from a generalized machine object by adding additional processes to handle the failure and replacement of the drill bit. An object that is built in this way is referred to as a derived object because it is sub-classed from an existing object.

Regardless which method is used to create an object, once created it is used in exactly the same way. An object can be instantiated any number of times into a model. You simply select the object of interest and place it (instantiate it) into your model.

As shown in Table 1 above, there are six basic classes of objects in Simio™. All six of the basic object types in Simio are sub-classed from a base class named Intelligent Object. This base class implements the base framework that allows intelligence to be added to an object. These classes provide a starting point for creating intelligent objects in Simio™. By default, all six object classes have very little native intelligence, but all have the ability to gain intelligence. Intelligent versions of these objects are built by modeling their behavior as a collection of event driven processes.

The first class is the most basic. It is simply referred to as a fixed object. A fixed object has a fixed location in the model and is used to represent the things in the system being modeled that do not move from one location to another. Fixed objects are used to represent stationary equipment such as machines, fueling stations, etc. The Source, Server, and Sink objects in the example model shown in FIG. 4 are fixed objects.

The second class of object in Simio™ is called an agent. Agents are objects that move freely through a 3-dimensional space and are typically used for developing agent-based models. This modeling view is useful for studying systems that are composed of many independently acting intelligent objects that interact with each other and, in so doing, create the overall system behavior. Examples of applications include market acceptance of a new product or service, or population growth of competing species within an environment.

The third class of object in Simio™ is an entity. An entity is sub-classed from the agent class and has one important added behavior. Entities can move through the system from fixed object to fixed object over a network of links and nodes. Examples of entities include customers in a service system, work pieces in a manufacturing system, ships in a transportation system, tanks in a combat system, and doctors, nurses, and patients in a health delivery system. The customers modeled in the example shown in FIG. 4 are modeled as entities.

Note that in traditional modeling systems such as GPSS or Arena, the entities are passive and are acted upon by the model processes. In the present invention, however, the entities can have intelligence and control their own behavior.

The fourth class of object is a transporter. It is sub-classed from the entity class. A transporter is an entity that has the added capability to pickup, carry, and drop off one or more other entities. By default, transporters have none of this behavior. But by adding model logic to this class, a wide range of transporter behaviors can be created. A transporter can model a taxi cab, bus, AGV, subway car, forklift truck, or any other object that has the ability to carry other entities from one location to another.

The fifth class of object in Simio™ is a link. A link is sub-classed from the fixed object class. A link defines a pathway for entity movement between two nodes. Links can be combined together into complex networks. Although the base link has little intelligence, behavior can be added to a link that will allow it to model unconstrained flow, congested traffic flow, or complex material handling systems such as accumulating conveyors or power and free systems. The paths modeled in the example shown in FIG. 4 are links.

The sixth class of object in Simio™ is a node. A node is sub-classed from the fixed object class. A node defines a starting and ending point for a link, and provides a point where multiple links can merge and diverge. Nodes also provide an interface between the travel network and fixed objects. Intelligent behavior can be added to nodes to model complex decision making. Example applications for nodes include intersections in a traffic grid, crossing points in an automatic guided vehicle network, or entry/exit stations in a subway. The paths in the example shown in FIG. 4 start and end at nodes.

A key feature of Simio™ is the ability to create a wide range of object behaviors from these six basic classes. The Simio™ modeling framework is application domain neutral—i.e., these six basic classes are not specific to manufacturing, service systems, healthcare, military, etc. However, it is easy to build application focused libraries comprised of intelligent objects from these classes designed for specific applications. For example, it is relatively simple to build an object, in this case, a link, that represents a complex accumulating conveyor for use in manufacturing applications. The design philosophy of Simio™ directs that this type of domain specific logic belong in the objects that are built by users, and not programmed into the core system.

Creating a Simio Model

Modeling using the system of the present invention begins with one of more of the above six base objects. These objects provide the foundation on which higher level objects are built. A base object in Simio™ is a fixed object, agent, entity, transporter, link, or node that has intelligence added by one or more processes. Processes give an object its intelligence by defining the logic that is executed in response to events.

Each process is a sequence of process steps that is triggered by an event or by object logic and executed by a token. A process always begins with a single Begin step, and ends with a single End step. A user selects other steps from a collection of process steps, such as the basic steps shown in Table 3, or other more advanced modeling steps, and defines the processes of interest in the system being modeled. A token is released by the Begin step and is simply a thread of execution (similar to entities in Arena). A token may have properties (or, input parameters) and states (runtime changeable values) that control the execution of the process steps. And, one can define his/her own classes of tokens that have different combinations of properties and states.

FIGS. 5-11 display pages from the Simio™ users manual and describe how to make a simple model.

The modeling power of the present invention comes from the set of events and standard processes that are automatically triggered for the six basic classes of objects, along with the process steps available to model state changes that occur in response to these events and standard processes. Fully mastering the art of building intelligent objects involves learning these events and standard processes and the collection of available process steps, along with the knowledge and experience of how to combine these steps to represent complex logic.

Each object class has its own set of events and standard processes. For example, fixed objects have events that fire when entities enter the object at a station within the object. Likewise a link provides standard processes that execute when entities enter and leave the link; (ii) merge fully onto the link; (iii) collide with or separate from other entities that reside on the link; and/or (iv) move within a specified range of another entity, etc. By providing model logic for these standard processes and adding additional processes to respond to events, the movement of entities across the link can be completely controlled. For example, to add accumulation logic to the link, a small standard process is written that is triggered when an entity collides with the entity it is following. Within this process it reassigns its speed to match the speed of the entity that it is following.

The process steps used to define the underlying logic for an object are stateless—i.e., they have properties (or input parameters) but no states (or output responses). This is important because then a single copy of the process can be held by the object class definition and shared by an arbitrary number of object instances. If the process logic is changed, this fact is automatically reflected by all instances of the object.

In some cases an object definition does not exactly meet the needs of a particular application because it lacks some specific logic. Although it is possible to sub-class the object and create a new object definition that includes the missing logic, in many cases it would be more desirable to add that logic to a specific instance of the object, without having to create a new object definition. Simio supports this capability through the concept of an "add-on" process that does not change the object definition and is executed only for that one instance of the object.

The builder of the object definition adds support for add-on processes by incorporating Execute steps at specific logical locations where an add-on process may be desirable. The purpose of the Execute step is to execute a process (if any) that has been passed into the object as a property. For example, the Simio standard library has a Source object that creates entities that are released into the system. This object has add-on processes that may be executed just before the entity is created, just after the entity is created, and just before the entity departs the Source object.

Note that an "add-on" process is a much more powerful concept than simply an "add-on" method call. An add-on process can model process delays that span simulated time, whereas a simple method call can only alter the state of the model at a specific instant in time.

Accordingly, in some embodiments, a process can be added to an instance of an object, wherein the added process does not change the object definition and is executed only for that one instance of the object.

Elements

The states for an object instance are held in elements. Elements define the dynamic components of an object and may have both properties (input parameters) and states (runtime changeable values). Within an object, the tokens may execute steps that change the states of the elements that are owned by the object. Like steps, there is a predefined set of elements available to the user for adding dynamic components to an object.

One example of an element is the station that defines a location within a fixed object. Stations are also used to define entry and exit points into and out of a fixed object. Entities can transfer into and out of stations (using the EnterStation and DepartStation steps). And a station maintains a queue of entities currently in the station as well as entities waiting to transfer into the station. A station has a capacity that limits transfers into a station. Hence, an entity arriving to an object over a link can only exit the link and enter the fixed object if the entry station for the object has capacity available. Another example of an element is the timer that is used to generate a sequence of events based on a time pattern or a by counting other events. A timer can be used for many different purposes: e.g. to control the rate of entry of entities into the system, or generate failures that follow a time pattern or that are based on the number of parts processed. Table 4 lists some examples of elements.

TABLE 4

General Modeling: Basic Elements

| Element | Description |
| --- | --- |
| Timer | Fires a sequence of events specified by a time pattern. |
| Monitor | Fires a sequence of events based on a state change or crossing. |
| TallyStatistic | Used by the Tally step to record values. |
| StateStatistic | Records statistics on a specified state variable. |
| Resource | A variable quantity that can follow a capacity pattern and be seized and released |
| Station | A physical location within an object. |

Applications of Simio Models

The range of applications for which the Simio™ modeling system can be used is not restricted, because a fixed, built-in model that cannot be altered or changed between applications is not used. his is especially important in the area of Finite Capacity Scheduling, where, for example, a factory model can be defined using the full general-purpose modeling power of the Simio™ tool. The complexities of the production process can be fully captured by the user-built Simio™ model. This not only includes the logic within each work center, but also the material handling required to move jobs between work centers.

The specialized requirements for FCS applications are addressed by incorporating features into Simio™ to specifically support the needs of FCS. These features include the support for externally defined job data sets along with very flexible modeling of resources and materials. Although these features are specifically designed to unleash the full modeling power of Simio™ for FCS applications, they are also useful in general modeling applications.

A Simio™ job data set allows a list of jobs to be externally defined for processing by the simulation model. The jobs are defined in a data set containing one or more tables, with relations defined between table columns. The specific schema for holding the job data is arbitrary. And it can be user defined to match the data schema for the manufacturing data (e.g. an ERP system). The job data typically includes release and due date, job routings, setup and processing times, material requirements, as well as other properties that are relevant to the system of interest. The objects in Simio™ can directly reference values specified in the job data set (e.g. processing time) without knowing the schema that was implemented to store the data.

The resource features built into Simio™ objects provide direct support for modeling complex resource selection and dynamic routing logic. Objects in Simio™ have a user-defined capacity and can be seized, released, and preempted by other objects. Objects can follow work shifts that can alter the time spent by a job being processed thereby. Objects can also model complex changeover logic for jobs that utilize the object (e.g. change-dependent or sequence-dependent changeovers). Objects can be placed in multiple lists, and selection of an object from a list can be based on flexible rules such as minimum changeover time or longest idle time. Jobs can also be dynamically routed between objects based on the state of an object (e.g. a machine). Objects also support very flexible rules (earliest due date, least remaining slack, critical ratio, etc) for selecting between competing jobs that are waiting to seize the object. Finally, the job usage history for objects can be displayed on an interactive Gantt chart.

The Materials element in Simio™ provides direct support to model things that can be consumed and produced during the execution of the model. Materials can also be defined hierarchically to model a traditional Bill of Materials (BOM) for manufacturing applications. Hence, a manufacturing step can be modeled as the consumption of a specific list of materials within the hierarchical BOM.

The present invention may be embodied in other specific forms without departing from its spirit or essential characteristics. As will be apparent to one skilled in the art, the functionality of the invention described herein is implemented by computer instructions which execute on a computer, in other words on a physical computing device. In a preferred embodiment, the computer instructions (software) are written in the C# programming language, and run on a MicroSoft Windows operating system.

The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. A computer-based system for developing simulation models on a physical computing device, the system comprising:
   one or more graphical processes;
   one or more base objects created from the one or more graphical processes,
   wherein a new object is created from a base object of the one or more base objects by a user by assigning the one or more graphical processes to the base object of the one or more base objects;
   wherein the new object is implemented in a 3-tier structure comprising:
   an object definition, wherein the object definition includes a behavior,
   one or more object instances related to the object definition, and
   one or more object realizations related to the one or more object instances;
   wherein the behavior of the object definition is shared by the one or more object instances and the one or more object realizations; and
   an executable process to add a new behavior directly to an object instance of the one or more object instances without changing the object definition and the added new behavior is executed only for that one instance of the object.

2. The computer-based system of claim 1, wherein the new object is created without the need for methods or programming.

3. The computer-based system of claim 1, wherein a derived object is created from an existing object by overriding one or more graphical processes assigned to the existing object and/or assigning additional graphical processes to the existing object.

4. The computer-based system of claim 3, wherein a composite object is created by combining two or more base objects, derived objects and/or objects that are themselves composite objects.

5. The computer-based system of claim 1, wherein types of base objects include 1) fixed objects, 2) agent objects, 3) entity objects, 4) transporter objects, 5) link objects, and 6) node objects.

6. The computer-based system of claim 1, wherein the graphical process is a sequence of process steps that is triggered by an event.

7. The computer-based system of claim 6, wherein the sequence of steps in a graphical process include a Begin step and an End step, and additional steps are added by a user from a collection of steps.

8. The computer-based system of claim 6, wherein event types include 1) time events, 2) logic events, 3) change events and 4) cross events.

9. The computer-based system of claim 1, wherein all the objects have standard processes that are triggered by model logic, and the standard processes define behavior all for the objects.

10. The computer-based system of claim 1, wherein a model is built by graphically combining one or more base, derived, and/or composite objects that represent physical components of a system being modeled.

11. The computer-based system of claim 10, wherein the model is a finite capacity scheduler.

12. The computer-based system of claim 10, wherein the system being modeled is a discrete system.

13. The computer-based system of claim 10, wherein the system being modeled is a continuous system.

* * * * *